Oct. 12, 1965  J. P. CREWS ETAL  3,210,933
NOZZLE
Filed Oct. 11, 1963
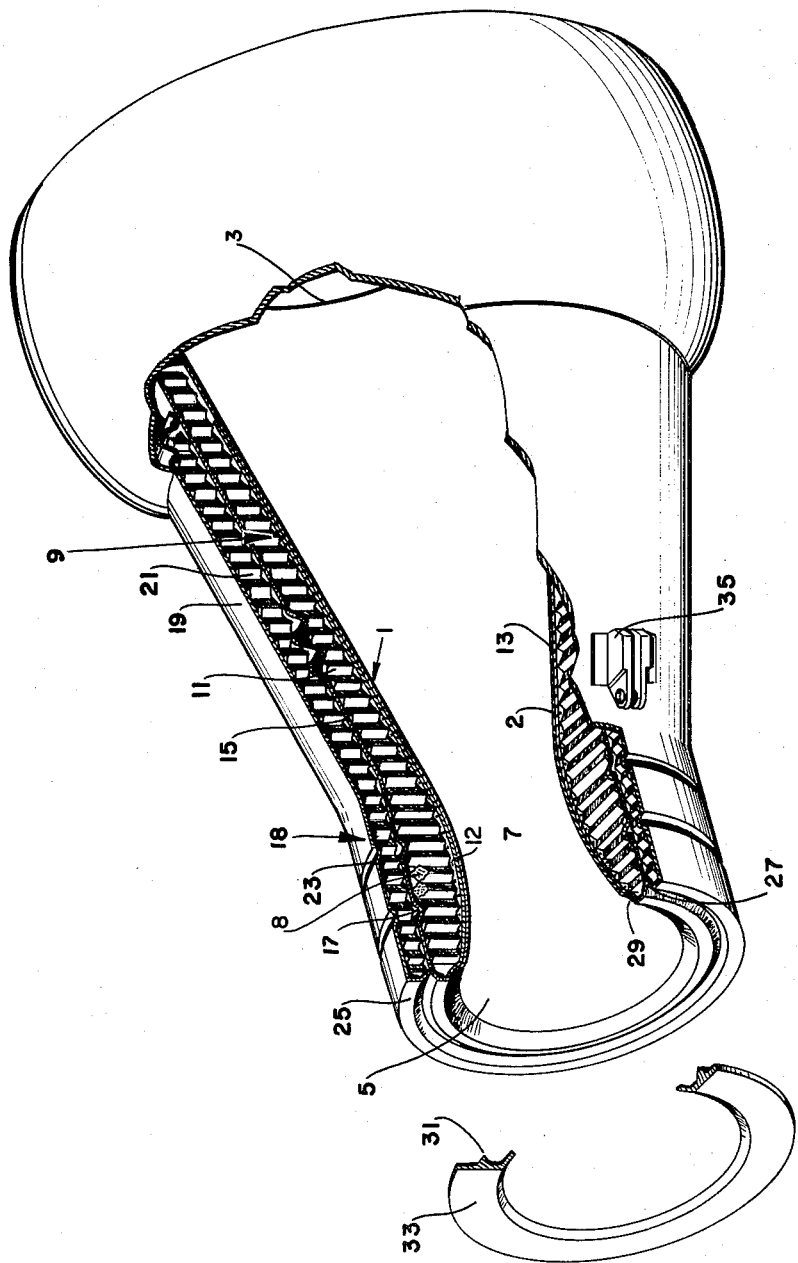
INVENTOR.
JOHN P. CREWS — ALBERT L. DeHAAN
BY
Arthur W. Sellens
ATTORNEY ll
United States Patent Office 3,210,933
Patented Oct. 12, 1965

3,210,933
NOZZLE
John P. Crews, Sacramento, and Albert L. De Haan, Carmichael, Calif., assignors, by mesne assignments, to the United States of America as represented by the Secretary of the Navy
Filed Oct. 11, 1963, Ser. No. 315,730
1 Claim. (Cl. 60—35.6)

This invention relates generally to nozzles, and more particularly to an improved light weight propulsion nozzle for use in connection with missiles.

It is a known fact that the propulsion jet of a missile results in an enormous build-up of heat inside the opening of the nozzle from which the jet issues. The dissipation of this heat into the side walls of the nozzle and into the structure adjacent thereto causes cracks to be developed in the nozzle as well as in the adjacent structure because of thermal stresses being induced by the differential expansion of the metals as a result of unequal heating.

Heretofore, in order to minimize the effects of these thermal inequalities, various changes such as increasing the wall thickness of the nozzle, incorporating insulation in the nozzle structure and installing cooling systems in the nozzle area were made in the various nozzle designs.

The difficulty with these nozzle designs was that they caused an overall increase in the weight factor which is very critical at the extreme rear end of the aircraft where the nozzle is positioned.

One of the objects of this invention is to provide an improved construction which, whilst satisfying the operating requirements, will be simple and of light weight.

Another object is to provide an improved nozzle construction which lowers the heat transmissibility through the nozzle structure.

Yet another object is to provide an improved nozzle construction possessing uniform stress distribution throughout the structure.

A still further object is to produce an improved nozzle construction which reduces the amount of material required for a given design, which reduces the space envelope necessary to produce a given heat drop over other types of construction and which reduces the weight necessary for a minimum weight design.

Other objects and many of the attendant advantages of this invention will be readily appreciated as the same becomes better understood by reference to the following which is considered in connection with the accompanying drawing wherein:

The single figure of the drawing is a perspective view in section showing the improved construction of our nozzle.

As shown in FIG. 1, reference numeral 1 designates an inner shell of an exhaust nozzle for the second stage of a polaris missile, in which the exhaust gases discharge rearwardly of said nozzle for providing the missile with forward propulsive thrust. As illustrated, the discharge end 3 of the shell 1 is circular in cross-section and is larger in diameter than its entrance opening 5 which is also circular in cross-section. A venturi passageway or throat area 7 connects the discharge end 3 with the opening 5 thereby defining an annular passageway whereby motive fluid exiting from a missile chamber (not shown) into the opening 5 undergoes contraction in the passageway 7 converting velocity energy into heat energy and then this fluid undergoes expansion in the discharge end 3 with conversion of heat energy of the fluid into velocity energy thereof to provide a jet issuing at high velocity to give the propulsive thust desired.

An intermediate shell 9, composed of a cellular honeycomb core construction 11, envelopes the inner shell 1 and is concentric therewith. The honeycomb is fabricated from high temperature resistant material such as tantalum, tungsten, titanium, etc. The honeycomb cells 11 making up the wall of shell 9 in the throat area 7 of the nozzle are packed with an appropriate salt or other such material 8 which undergoes a phase change on heating to form a gas. Preferably the material which is packed into the individual cells of the honeycomb structure is only placed in the honeycomb cells in the region of the nozzle throat since the throat is the area that is subjected to the greatest heat. Typical salts which can be packed within the cells of the honeycomb are salts which undergo a phase change from a solid to a gas on being heated.

Examples of salts possessing this property include hydrated trisodium phosphate ($Na_3PO_4.12H_2O$); ammonium chloride ($NH_4CL$); ammonium oxalate $$[(NH_4)_2C_2O_4.H_2O]$$

and ammonium sulphate [$(NH_4)_2SO_4$]. If it is desired, the salt or other material capable of undergoing a phase change to a gas can be admixed with a resin or plastic material prior to being packed within the cells.

Inner surface of shell 1 contains pores or openings not shown on the drawing to permit the gas formed by the sublimation of the aforesaid salts to bleed through to the inner layer 2 of the nozzle. The gas flows along this inner surface of the nozzle as a laminar layer. This transpiration cooling feature aids in both cooling and thermally insulating the nozzle.

The outer surface 15 of shell 9 has annular depressions 17 spaced along its length to function as expansion media to relieve stresses which may be induced by the differential expansion of metals caused by unequal heating.

An outer shell 18 having an outer surface 19 and being made of a cellular core construction 21 is placed around shell 9 so that it is concentric therewith so that the cellular core construction abuts its outer surface 15. The outer surface 19 contains annular depressions 23 along its length to function as expansion media to relieve stresses which may be the differential expansion of metals caused by unequal heating.

A circular plate 25 joins shells 1, 9 and 18 together at their forward ends in a concentric nested relationship. It is important that a tight seal be effected therebetween in order to prevent exhaust gases from discharging forwardly. In order to accomplish this result, an organic seal element may readily be provided therebetween; however, in lieu of such a seal element, plate 25 contains an annular V groove 27 and terminates into a joggled portion 29 whereupon a gas seal is effected when the V groove is used in conjunction with an annular ring 31 on nozzle insulation plate 33. Clevis fork 35 is used to secure the nozzle to the missile (not shown).

A thermal analysis was conducted on this nozzle construction as an indication of the heat drop which may be expected between the inner shell 1 and the outer surface 19 of shell 18. The temperatures on the inside of the nozzle along the inner shell 1 ranged from 400° F. to 4200° F., while the temperatures along the outer surface 19 of shell 18 ranged from 275° F. to 450° F. This significant reduction in temperature between the outside and the inside of the nozzle is due partially to the small individual compartments in the cellular core construction of the shells 9 and 18 which help maintain the air in a quiescent condition resulting in low transmission by convection and due partially to the multi-radiating surfaces which reduces the heat transmission greatly and is inversely proportional to the number of surfaces used. Transmission of heat by conduction is also reduced due to relatively small conduction area with respect to the exposed inner surface area and contact resistances at the joining surfaces.

In summary, our invention achieves objectives long sought for in propulsion systems by its novel arrangement of component parts whereby the cellular core sandwich construction affords maximum heat reduction thus eliminating any necessity for additional conventional insulating and cooling systems.

While we have described our invention in detail in its present preferred embodiment, it will be obvious to those skilled in the art, after understanding our invention, that various changes and modifications may be made therein without departing from the spirit or scope thereof. We aim, in the appended claim, to cover all such modifications.

We claim:

In a propulsion jet nozzle for missiles and like vehicles:
(a) a porous hollow shell of circular cross section having an entrance opening and a discharge opening, the discharge opening being substantially larger in cross section than the entrance opening, said entrance opening being connected by a venturi passageway with said discharge opening thereby defining an annular fluid passageway therein;
(b) an intermediate shell of circular cross section positioned around the outside of the hollow shell so that it is concentric thereto, said intermediate shell having its interior sub-divided by metallic wall means into separate compartments defining a cellular core construction, said intermediate shell also having annular depressions along its outer surface to function as expansion media to relieve stresses produced by the differential expansion of metals caused by unequal heating;
(c) a salt, capable of undergoing sublimation upon heating, packed inside the compartments of the cellular core construction, said salt being one selected from the group consisting of hydrated trisodium phosphate; ammonium chloride; ammonium oxalate and ammonium sulphate whereupon the gas formed on sublimation of the salt bleeds through the hollow intermediate shell and flows along the surface of the hollow shell to form a laminating layer thereon;
(d) a third shell of circular cross section having its interior sub-divided by metallic wall means into separate compartments defining a cellular core construction positioned around the outside of the intermediate shell so that it is concentric thereto, said third shell having annular depressions in its surface spaced along its length to function as expansion media to relieve stresses produced by the differential expansion of metals caused by unequal heating.

References Cited by the Examiner

UNITED STATES PATENTS

| | | | |
|---|---|---|---|
| 2,574,190 | 11/51 | New | 60—35.6 X |
| 2,640,317 | 6/53 | Fentress | 60—35.6 |
| 2,941,759 | 6/60 | Rice et al. | 244—117.1 |
| 3,014,353 | 12/61 | Scully et al. | |
| 3,022,190 | 2/62 | Feldman. | |
| 3,052,431 | 9/62 | Compton. | |
| 3,122,883 | 3/64 | Terner | 60—35.6 |
| 3,115,746 | 12/64 | Hsia | 60—35.6 |
| 3,151,712 | 10/64 | Jackson | 189—34 |

FOREIGN PATENTS 1,003,758  11/51  France.

JULIUS E. WEST, *Primary Examiner.*

CARLTON R. CROYLE, *Examiner.*